US009144196B2

(12) United States Patent
Francis

(10) Patent No.: US 9,144,196 B2
(45) Date of Patent: Sep. 29, 2015

(54) LAWN CARE MAINTENANCE APPARATUS

(71) Applicant: Thomas J. Francis, Clinton Township, MI (US)

(72) Inventor: Thomas J. Francis, Clinton Township, MI (US)

( * ) Notice: Subject to any disclaimer, the term of this patent is extended or adjusted under 35 U.S.C. 154(b) by 164 days.

(21) Appl. No.: 13/763,071

(22) Filed: Feb. 8, 2013

(65) Prior Publication Data

US 2013/0219845 A1   Aug. 29, 2013

Related U.S. Application Data

(63) Continuation-in-part of application No. 12/653,777, filed on Dec. 22, 2009, now abandoned.

(60) Provisional application No. 61/278,846, filed on Oct. 14, 2009.

(51) Int. Cl.
*A01D 43/16*   (2006.01)

(52) U.S. Cl.
CPC ...................................... *A01D 43/16* (2013.01)

(58) Field of Classification Search
CPC .......... A01D 43/16; A01D 34/84; A01G 3/06
USPC .............................. 172/13, 14, 17, 15; 30/292
See application file for complete search history.

(56) References Cited

U.S. PATENT DOCUMENTS

| 416,982 | A | * | 12/1889 | Young | 172/545 |
|---|---|---|---|---|---|
| 872,861 | A | | 12/1907 | Theberath | |
| 1,010,260 | A | * | 11/1911 | Hill | 56/251 |
| 1,732,308 | A | | 10/1929 | Livingston | |
| 2,730,856 | A | | 1/1956 | Mekalainas | |
| 2,752,841 | A | * | 7/1956 | La Plante | 172/14 |
| 2,888,993 | A | * | 6/1959 | Dunning | 172/15 |
| 2,901,878 | A | | 9/1959 | Johnson | |
| 3,006,421 | A | * | 10/1961 | Feilbach | 172/15 |
| 3,133,597 | A | | 5/1964 | Smith | |
| 3,184,906 | A | | 5/1965 | Congalton | |
| 3,221,822 | A | * | 12/1965 | Dedoes | 172/22 |
| 3,393,572 | A | | 7/1968 | Larsson | |
| 3,590,926 | A | * | 7/1971 | Tepera | 172/15 |
| 3,684,027 | A | * | 8/1972 | Crawford | 172/15 |
| 3,684,028 | A | * | 8/1972 | Crawford | 172/15 |
| 3,690,384 | A | | 9/1972 | Patterson | |
| D238,441 | S | * | 1/1976 | Julian | D15/17 |
| 4,072,195 | A | * | 2/1978 | Carlson | 172/15 |
| 4,117,652 | A | * | 10/1978 | Jones et al. | 56/11.8 |
| 4,171,724 | A | * | 10/1979 | Steele | 172/15 |

(Continued)

OTHER PUBLICATIONS

International Search Report, PCT/US2014/014690—3 pages.

*Primary Examiner* — Thomas B Will
*Assistant Examiner* — Joel F. Mitchell
(74) *Attorney, Agent, or Firm* — Gifford, Krass, Sprinkle, Anderson & Citkowski, P.C.; Douglas J. McEvoy

(57) ABSTRACT

A mower drive wheel incorporating an edging plate including a number of different blade edge profiles for assisting in edging various types and thicknesses of grass or turf. The drive wheel can be reconfigured so that a one piece edging plate is replaced by a plurality of individually attachable blades. A modified walk behind powered mower is also disclosed and which integrates an adjustment mechanism for modifying a rotary turning speed of the edging drive wheel. A secondary drive wheel disconnect linkage is included and the main blade housing of the mower can also exhibit a widened profile to facilitate vacuum intake of the edging debris.

8 Claims, 13 Drawing Sheets

(56) References Cited

U.S. PATENT DOCUMENTS

| | | | |
|---|---|---|---|
| 4,461,138 A * | 7/1984 | Whitman | 56/12.7 |
| 4,589,252 A | 5/1986 | Williams | |
| 4,718,221 A * | 1/1988 | Wessel et al. | 56/16.9 |
| 4,735,038 A | 4/1988 | Williams | |
| 4,852,658 A | 8/1989 | Wessel et al. | |
| 4,907,344 A | 3/1990 | Hahn | |
| 5,065,567 A | 11/1991 | Wessel et al. | |
| 5,442,901 A | 8/1995 | Niemela et al. | |
| 5,528,891 A * | 6/1996 | Wzietek | 56/16.7 |
| 5,662,172 A | 9/1997 | Brown | |
| 5,857,315 A | 1/1999 | Keane | |
| 5,966,914 A | 10/1999 | Reents | |
| 6,067,784 A | 5/2000 | Jordan | |
| 6,154,967 A | 12/2000 | Rogala | |
| 6,701,700 B2 | 3/2004 | Keane | |
| 6,926,090 B2 | 8/2005 | Sergyeyenko et al. | |
| 7,331,889 B2 * | 2/2008 | Hartley | 474/46 |
| 7,516,602 B1 | 4/2009 | O'Dell | |
| 7,588,090 B2 | 9/2009 | Dairon et al. | |
| 8,201,639 B2 | 6/2012 | Szurpicki | |

\* cited by examiner

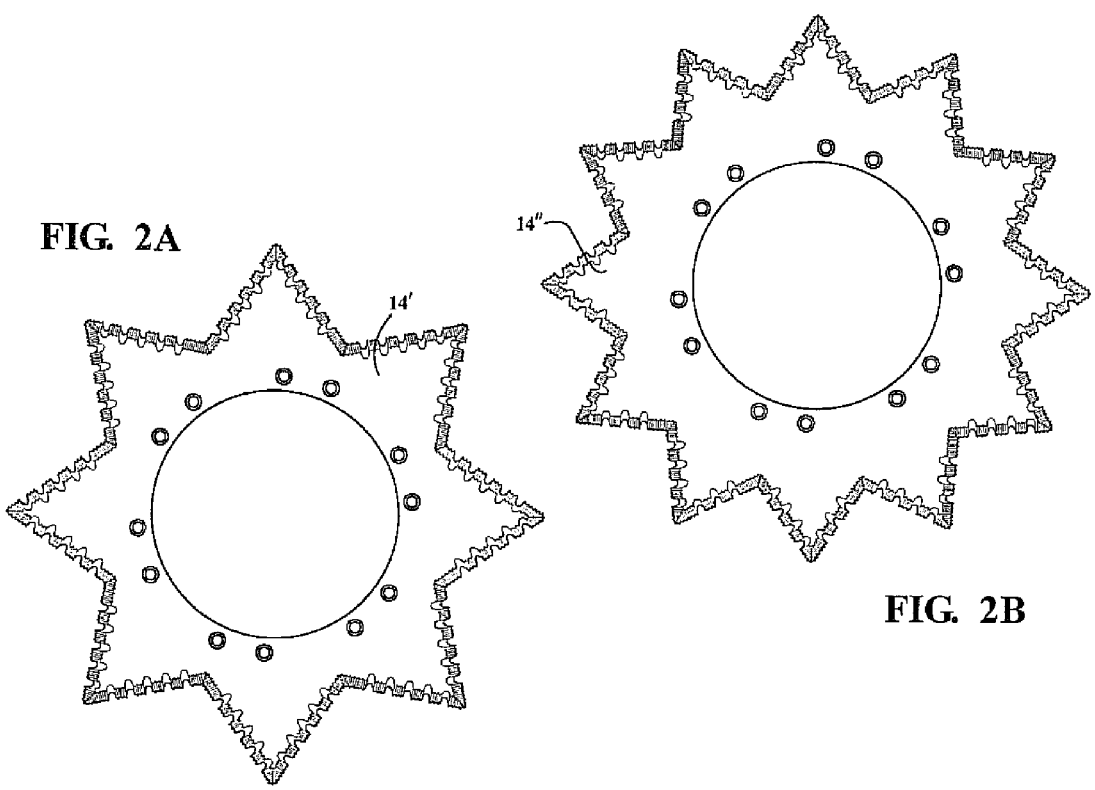

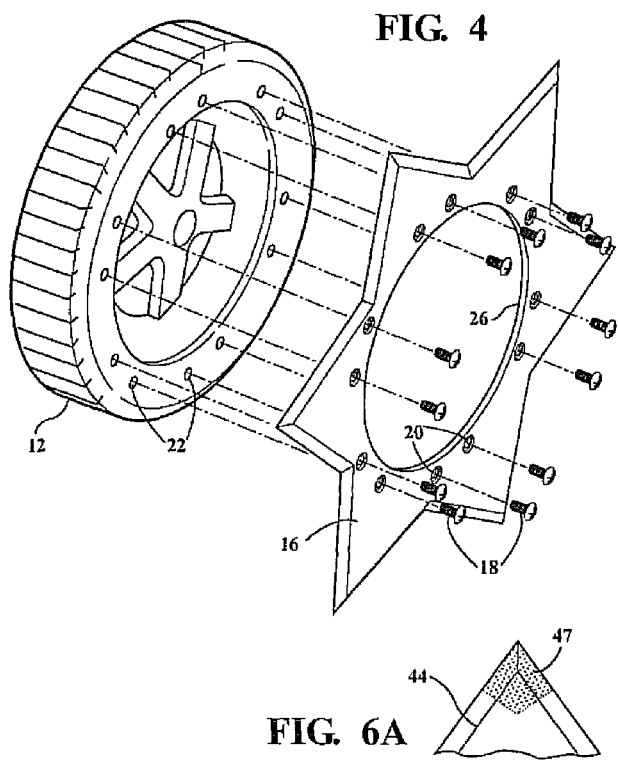
FIG. 4
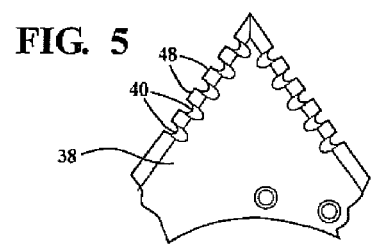
FIG. 5
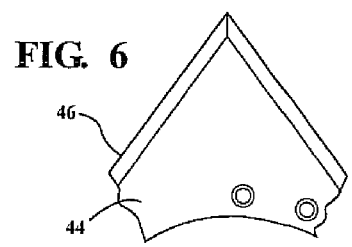
FIG. 6
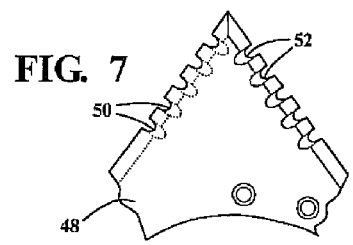
FIG. 7
FIG. 6A

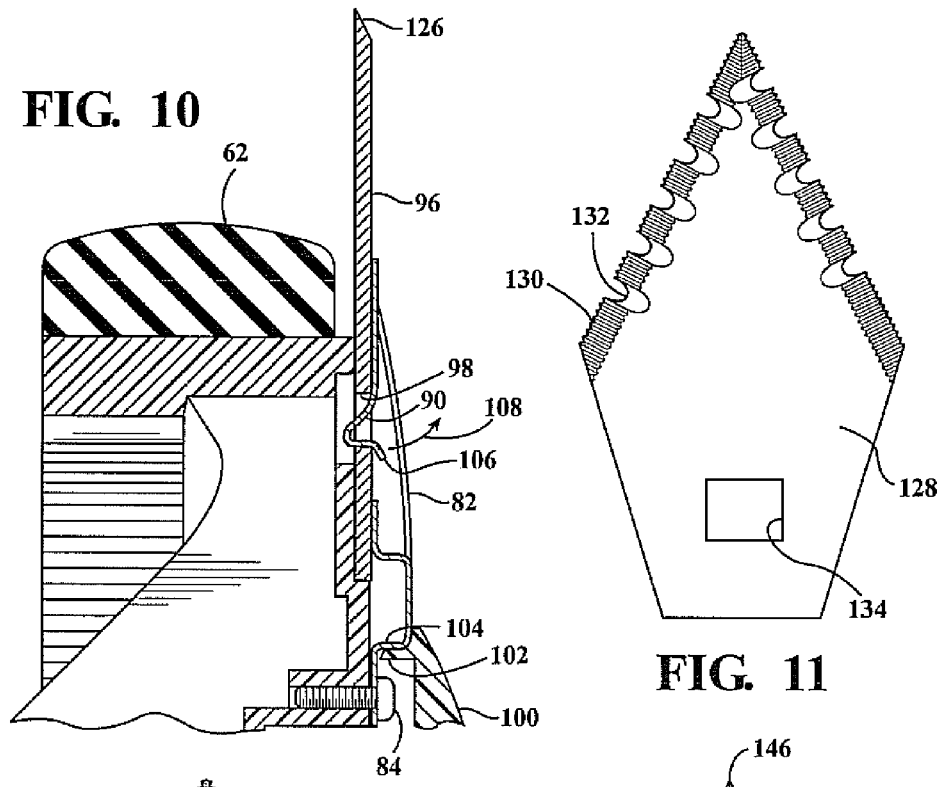
FIG. 10
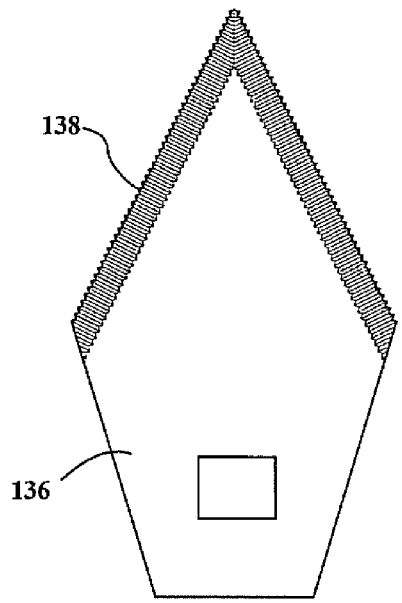
FIG. 12
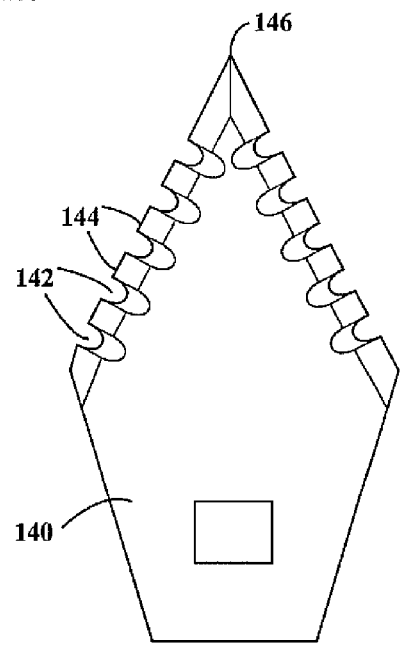
FIG. 11
FIG. 13

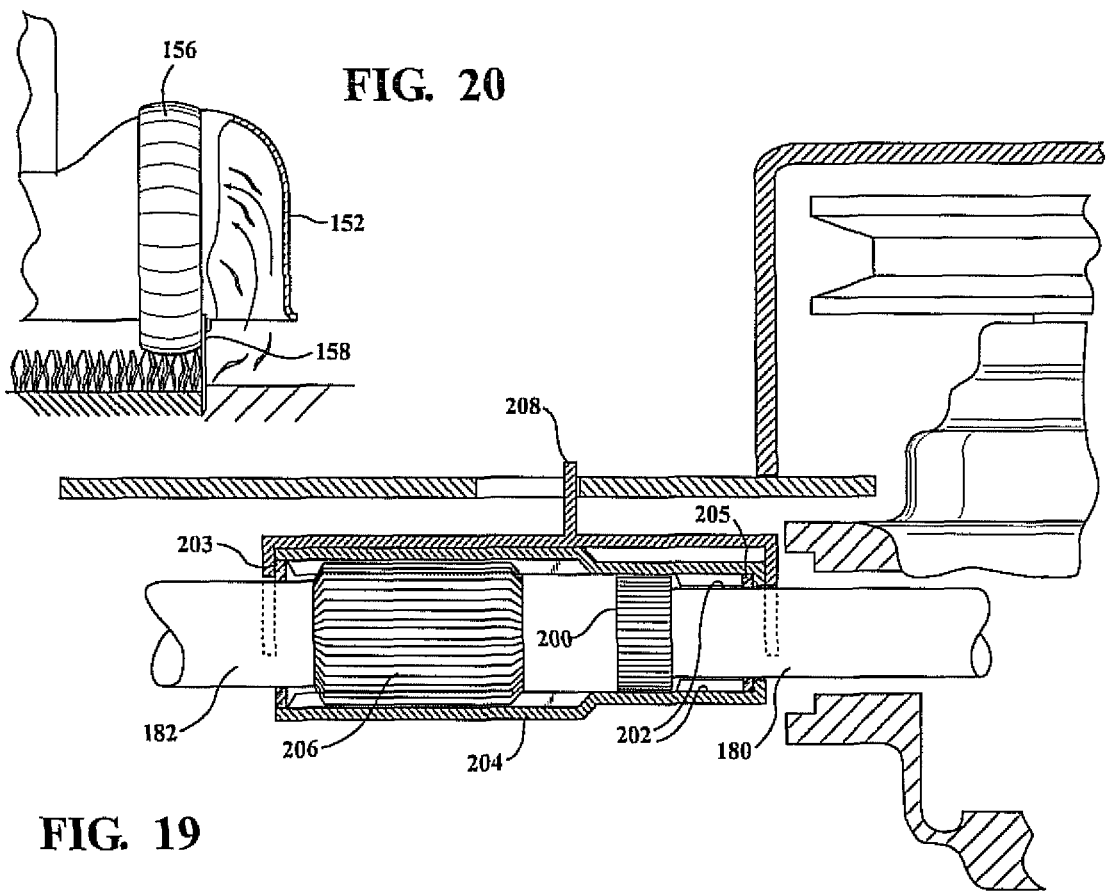

US 9,144,196 B2

LAWN CARE MAINTENANCE APPARATUS

CROSS-REFERENCE TO RELATED APPLICATIONS

This Application is a Continuation-in-part of application Ser. No. 12/653,777 filed on Dec. 22, 2009. Application Ser. No. 12/653,777 claims the benefit of U.S. Provisional Application 61/278,846 filed on Oct. 14, 2009.

FIELD OF THE INVENTION

The present invention relates to an edging apparatus and assembly for incorporation into a powered drive wheel associated with a walk behind mower. More specifically, the present invention discloses a number of related variants for carrying out a mower assisted edging operation, these including each of a circular shaped and outer blade edged plate attachable to an existing mower drive wheel, a plurality of blades individually secured in outwardly arrayed (and optionally adjustable) fashion to the drive wheel, a combination drive wheel and circular blade produced as a single unit, and a modified walk behind powered mower incorporating a rotary speed adjustment mechanism associated with the edging wheel, as well as an optional secondary drive wheel disconnect linkage.

DESCRIPTION OF RELEVANT ART

The prior art is documented with examples of lawn mower attachment devices. A first of these includes the ground penetration and steep terrain stabilization disks of Williams, U.S. Pat. No. 4,589,252, and in which the disks each exhibit outwardly extending and peripherally spaced points and are secured over the hub and tread of one or more of the lawn mower wheels. In this fashion, the points penetrate the turf to prevent lateral slippage of the mower as its traverses a sloped surface.

Livingston, U.S. Pat. No. 1,732,308 discloses a lawn mower attachment with a cutter detachably secured to a traction wheel. The cutter exhibits a disc having a cutting edge around its periphery and a central opening. A plurality of "L" shaped bolts extend from inner surfaces of the disc and engage over the wheel in order to mount the disc to the wheel.

SUMMARY OF THE INVENTION

The present invention discloses a number of variants for carrying out a mower assisted edging operation. In a first variant, a replacement drive wheel with integrated edging plate is provided and which substitutes for an existing wheel associated with the mower. The edging plate can include a number of different outer circumferential projecting patterns, such as without limitation including eight or twelve individual points or projections, each of which further exhibiting a variety of different blade edge profiles or configurations and such as which can be designed for assisting in edging various types and thicknesses of grass or turf. In a further variant, the replacement drive wheel can be reconfigured so that the one piece integrated blade is replaced by a plurality of blades, these being individually secured via clip and engagement apertures defined in each blade and in an outwardly arrayed (and optionally radially adjustable) fashion to the outer surface of the drive wheel, and which is held in place by a blade retention covering cap.

A modified walk behind powered mower is also disclosed and which integrates an adjustment mechanism for modifying a rotary turning speed of the drive wheel into which is incorporated the edging plate. An optional secondary drive wheel disconnect linkage is also incorporated into the modified mower, this in order to optimize the functionality of the mower during an edging operation. The main blade housing of the mower can also be enlarged/widened to facilitate vacuum intake of the edging debris, this reducing on cleanup.

BRIEF DESCRIPTION OF THE DRAWINGS

Reference will now be made to the attached drawings, when read in combination with the following detailed description, wherein like reference numerals refer to like parts throughout the several views, and in which:

FIG. 2A is a plan view of an edging plate with an eight point configuration;

FIG. 2B is a plan view of an edging plate with a twelve point configuration;

FIG. 4 is an exploded view of the edging apparatus of FIG. 1 and which can include attachment of the edging plate via a plurality of screw fasteners;

FIG. 5 is an enlarged partial view of a selected point of an edging plate and which illustrates one non-limiting serrated profile;

FIG. 6 is a partial view of a point associated with another edging plate and exhibiting a continuous blade edge;

FIG. 6A is a further partial view of a point such as in FIG. 6 and which depicts a carbide tip;

FIG. 7 is an illustration similar to FIG. 5 and which depicts a reversible plate with sharpened and serrated blade edge profiles on both sides thereof;

FIG. 10 is a side cross section of an assembly similar to that depicted in FIG. 8 which extends through a centerline of a selected (non-adjustable) blade exhibiting a single slot and in which an inwardly biased clip associated with the attachable cap seats within the slot and fixes the blade within its aligning recess pocket defined in the outer face of the wheel;

FIG. 11 is an illustration of a selected attachable blade exhibiting a serrated edge pattern common to previous disclosed variants;

FIG. 12 is an illustration of a further selected attachable blade exhibiting a modified and more finely serrated edge profile;

FIG. 13 is an illustration of a yet further selected attachable blade exhibiting a further alternate serrated edge profile;

FIG. 19 is a succeeding illustration of the forward disengagement mechanism in a second laterally displaced position in which the second drive wheel support shaft is uncoupled from the output linkage; and FIG. 20 is a partial end cutaway further depicting the widened design of the main blade housing of the mower for facilitating vacuum intake of the edging debris.

DETAILED DESCRIPTION OF THE PREFERRED EMBODIMENTS

As will be disclosed over the successive illustrations, the present invention discloses a number of related variants for carrying out a mower assisted edging operation, and by which an outer blade edged plate can be attached or integrated into a drive wheel of the mower. By this construction, a self-propelled walk behind mower can be repurposed in a manner in which the drive wheel can additionally function in a lawn edging operation and in a manner in which the relatively low revolutions per minute (RPM) of the drive wheel can effectively operate the edger plate.

Figure 1:
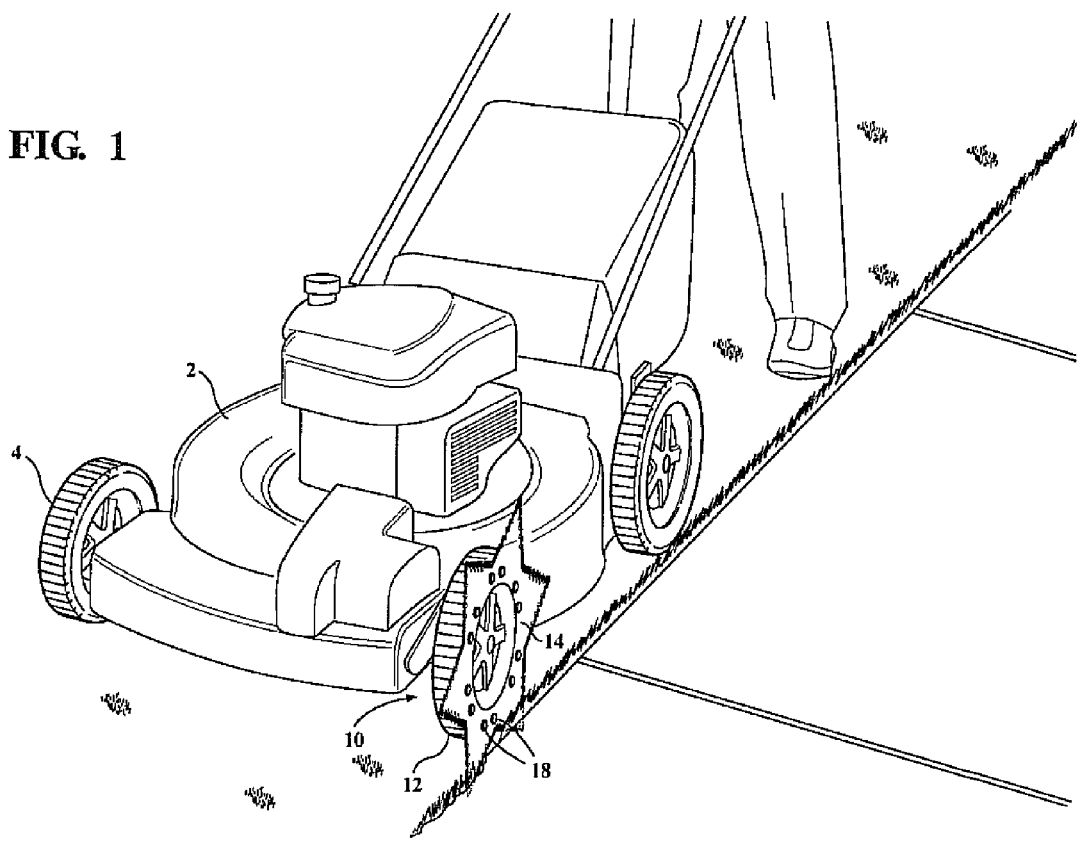
FIG. 1 is an environmental view of a mower incorporating a drive wheel edging apparatus according to a first embodiment.

Referring now to FIG. 1, an environmental view is shown of a mower 2 incorporating a drive wheel edging assembly, generally at 10, according to a first embodiment. The self-propelled and walk behind mower 2 depicted in FIG. 1 (as opposed to that shown in alternate embodiment of FIG. 16) is of a general construction known in the art. The mower 2 can include either a single or pair of forward positioned drive wheels, as shown by selected forward wheel 4 and combination wheel and edging assembly 10, this depending upon the type of mower and whether a clutch mechanism is incorporated for selectively disengaging one of the drive wheels (reference again being made to the subsequent variant of FIG. 16 et seq. in which such a clutch or disengagement mechanism is integrated into the mower construction. For purposes of the present invention, it is understood that the assembly 10 can be likewise substituted for the other drive wheel 4, depending upon the desire for either left or right hand assisted edging.

Figure 3:
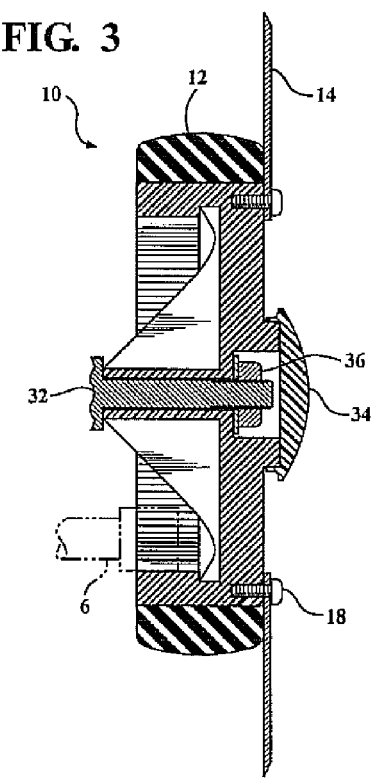
FIG. 3 is a side cutaway of the combination wheel and edging apparatus of FIG. 1 and illustrating the features of the take-off drive associated with the self-propelled mower for rotating the combination wheel and edging plate.

Reference is also made to output drive gear depicted in phantom in FIG. 3 and which is understood to communicate with additional gearing incorporated into the mower wheel 12 to facilitate rotation thereof at a speed suitable for performing an edging operation. While not requiring any particular driving speed of the wheel, the assembly of the present invention is understood to be capable of providing effective and safer edging operation at lower rotational speeds (e.g. under 300 rpm) and as opposed to significantly higher speeds normally associated with dedicated edging apparatuses.

As further shown in the side cutaway of FIG. 3, the assembly 10 includes a wheel 12 to which is attached one indicated edging plate 14 of selected configuration. The wheel 12 and edging plate 14 are contemplated in one embodiment as a substitute or replacement for a similarly constructed wheel provided with the originally manufactured mower 2, however the present invention also contemplates that an original drive wheel can be retrofitted to receive a suitable edging plate 14, and such as which can be sold as a single item.

This is also shown in FIG. 4 and which depicts attachment of a similarly designed edging plate 16 (as compared to as shown at 14 in FIG. 1) via a plurality of threaded bolt fasteners 18 which insert through apertures 20 defined around a perimeter of the plate 16 and which are received within aligning and interiorly threaded apertures 22 established in the end face of the wheel 12. While it is desirable in most applications to permit dismounting of the edging plate 14 or 16 (such as to facilitate sharpening of its individual perimeter extending blades or points), it is also envisioned that the plate can be permanently mounted to the wheel 12 such as through the use of rivets or other permanent fasteners (such as representatively indicated at 24 in FIG. 2).

Regardless of the manner of affixing, the selected edging plate 14 or 16 is understood to exhibit a generally annular body extending between an inner perimeter edge 26 (again FIG. 4) and a plurality of outward projecting/extending and peripherally or circumferentially spaced apart blades (or points), such that the edging plate may be mounted over the exposed face of the mower drive wheel 12 as depicted in FIGS. 1 and 3. The edging plate can also be constructed of any material including steel or composites thereof, and is further envisioned as capable of being produced as a high impact resistant polymer which can retain a durable blade edge in operation.

Referring again to FIG. 2, a plan view is shown of edging plate 14 incorporated into the apparatus of FIG. 1 and which illustrates a six point configuration with a continuous perimeter extending blade edge profile. Similarly, FIG. 2A is a plan view of an edging plate 14' with an eight point configuration and FIG. 2B further showing an edging plate 14" with a twelve point configuration.

Figure 2:
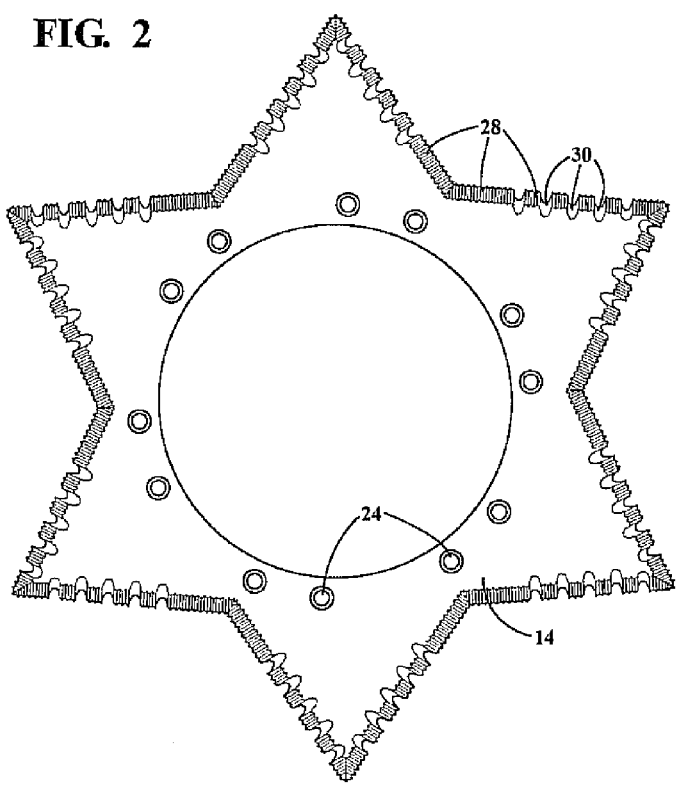
FIG. 2 is a plan view of an edging plate incorporated into the apparatus of FIG. 1 and which illustrates a six point configuration with a continuous perimeter extending blade edge profile.

Each of the edging plate designs 14, 14' and 14" exhibits a selected blade edge profile, such as depicted by the serrated pattern best shown in FIG. 2 and which includes a first pattern of incising edge locations 28, these being alternated with enlarged and notched incising locations 30. As will be further described, the dimensions, angles and the like associated with the incising blade edge profile, including the number of individual points or projections as well as their respective profiles, is not limited to any particular design and is further understood to be modifiable such as in order to adapt a given edging plate to any desired edging application, this including use with varying and different types of grass or turf which are known to exist.

FIG. 3 again illustrates a side cutaway of the combination wheel and edging apparatus of FIG. 1 with the features of the take-off drive (see again drive component at 6) associated with the self-propelled mower for rotating the combination wheel 12 and edging plate 14 such as about a heavy duty carriage bolt 32 which mounts the assembly 10 to the mower 2. Also depicted at 34 is a decorative covering cap 34 which can be applied over the exposed head 36 of the carriage bolt 32.

FIG. 5 is an enlarged partial view of a selected point 38 of an edging plate according to a further variant and which illustrates a further non-limiting example of a serrated profile in which a plurality of notched locations 40 (these being designed to also assist in debris removal of the cut turf during its operation), and which alternate with straight edge locations 42. FIG. 6 is a partial view of a point 44 associated with another edging plate and exhibiting a continuous blade edge 46.

FIG. 6A is a further partial view of a point 44 such as in FIG. 6 and which depicts a carbide (or like coated) tip 47. FIG. 7 is an illustration of a blade edge pattern largely similar to that shown FIG. 5 and which depicts a point 48 associated with a reversible edging plate with sharpened and serrated blade edge profiles on both sides thereof, as depicted by a first plurality of notched location 50 along a first edge and a second plurality of notched locations 52 along a succeeding edge and on a reverse face of the edging plate.

Figure 8:
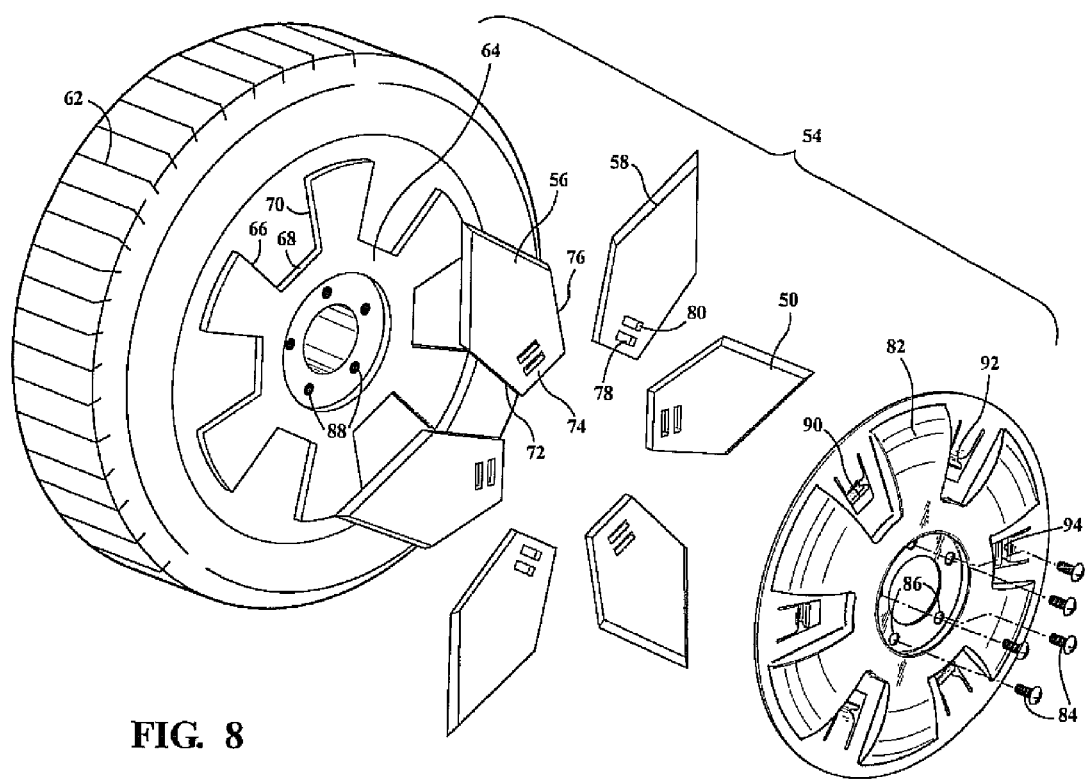
FIG. 8 is an exploded view of the replacement drive wheel according to a further embodiment and in which the one piece integrated blade is replaced by a plurality of blades individually secured via clip and engagement apertures defined in each blade and in an outwardly arrayed (and optionally radially adjustable) fashion to the outer surface of the drive wheel and which is held in place by a blade retention covering cap.

FIG. 8 is an exploded view, generally at 54, of a replacement drive wheel with edging elements according to a further embodiment and in which the one piece integrated blade is replaced by a plurality of blades 56, 58, 60 et seq. A redesigned drive wheel is depicted at 62 and which includes a template 64 secured to its outer face, the template 64 depicting a plurality of peripherally arrayed receiving pockets (see for example shown by interconnected recessed edges 66, 68 and 70, for receiving appropriately sized edges 72, 74 and 76 of selected blade 56 and in order to mount the blades in individually and outwardly arrayed fashion upon the outer template face of the drive wheel.

The blades 56, 58, 60 as shown in FIG. 8 each include an arrow like (or any other suitable) edge profile which facilitates performance of an edging operation in similar fashion as described with respect to the edging plates of previous embodiments. The blades as shown are further understood to be capable of being reversed in use, and as further understood from the description of the various blade edges as described in each of the variants of FIGS. 1-7 and 8-15. As further depicted with reference to selected blade 58, a pair of engagement apertures are shown by inner perimeter defining edges 78 and 80. A covering cap 82 is provided and is secured to the wheel 62, such as by threaded bolts 84 inserting through a central array of apertures 86 in the cap and engaging aligning interiorly threaded apertures 88 in the wheel 62 in order to mount the cap 82 in an adhering fashion over the template 64 once the blades 56, 58, 60, et seq. are prepositioned within their respective template defined pockets.

Integrated into the covering cap 82 are a plurality of aligning biasing clips, see at 90, 92, 94 et seq., these being formed from such as the cap (e.g. a spring steel metal or durable and resilient polymer) and which are arranged in a like peripheral spaced apart fashion corresponding to the blades once they are seated within their respective template defined pockets and so that, upon mounting the cap 82 in the manner described above, inwardly extending and biased edge locations corresponding to each clip, are seated within a selected aperture associated with the given blade. Depicted in FIG. 10 is a side cross section of an assembly similar to that depicted in FIG. 8 which extends through a centerline of a selected (non-adjustable) blade 96 exhibiting a single slot 98, within which an inwardly biased clip 90 associated with the attachable cap 82 seats in order to affix the blade within its aligning recess pocket defined in the outer template face of the wheel 62. A center hub cap 100 is partially shown in FIG. 10 and can include an outer facing and biasing edge profile 102 for engaging an opposing inner perimeter edge 104 of the cap 82 for sealing over the bolt array 84.

It is understood that the biasing clip locations defined in the covering cap 82 are not limited by what is disclosed and can include other shaped and configurations which allow for a desired degree of biasing bend or deflection in order to retain the blade in place. As again shown in FIG. 10, a configured inner edge 106 of the selected clip 90 can be deflected or bent outwardly (see arrow 108), this in order to outwardly deflect its inwardly curled profile in unseating fashion from the aperture 98, thereby permitting the selected blade 96 to be withdrawn from the wheel and supporting template without having to first remove the covering cap 82.

Figure 9:
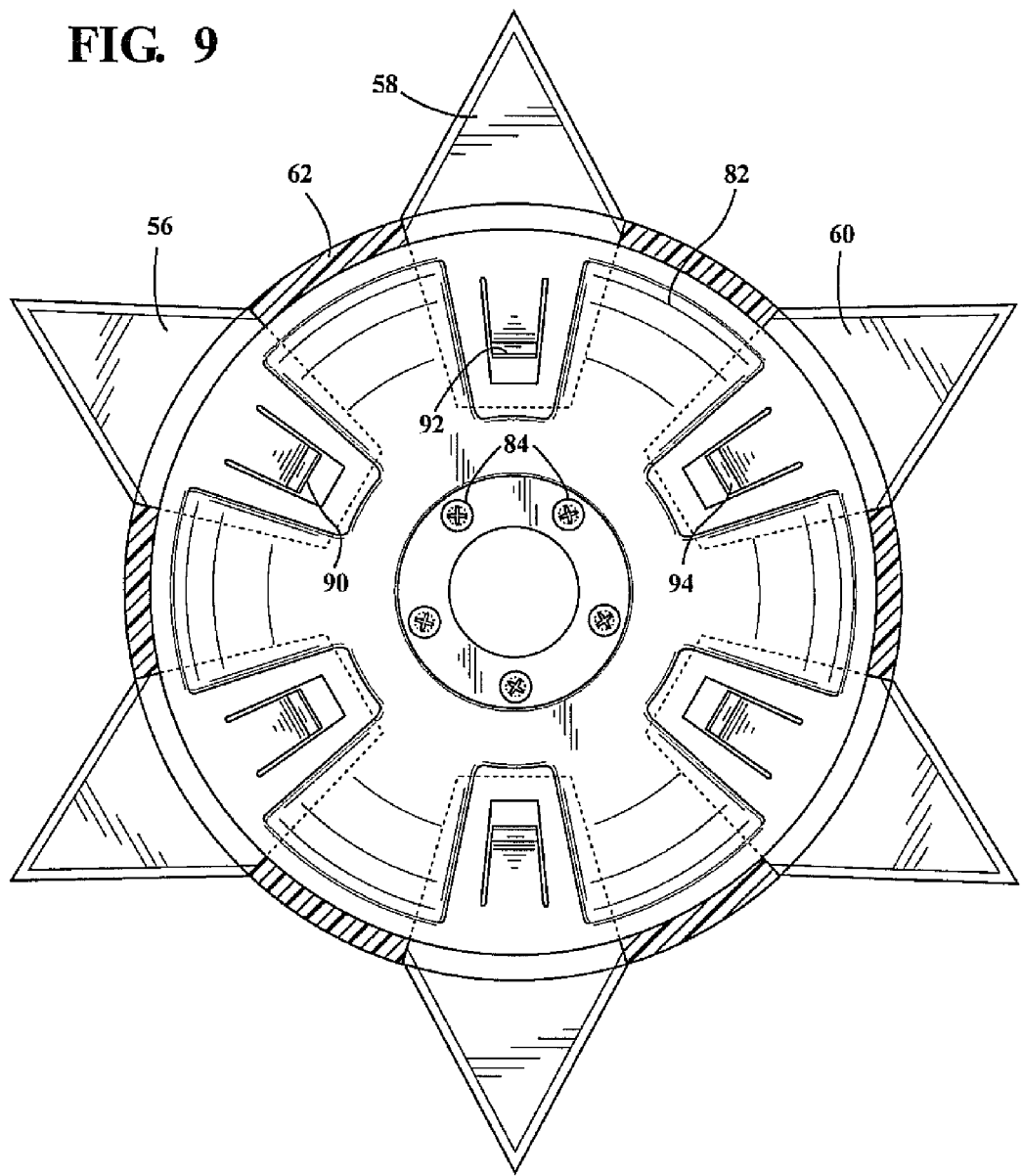
FIG. 9 is a plan view of FIG. 8 and depicting a plurality of six individual blades (points) arranged in radially outwardly engaged fashion according to one non-limiting variant.

FIG. 9 is a plan view of FIG. 8 and depicting a plurality of six individual blades (points) as depicted in FIG. 8 arranged in radially outwardly engaged fashion according to one non-limiting variant. In one non-limiting application each of the blades 56, 58, 60 et seq. can extend in a range of 2.0" to 2.5" from the outer edge of the wheel 62, it being understood that the blade design is capable of being modified as to bother dimension and edge profile in order to optimally function with any type or consistency of grass or turf to be edged.

Figure 9A:
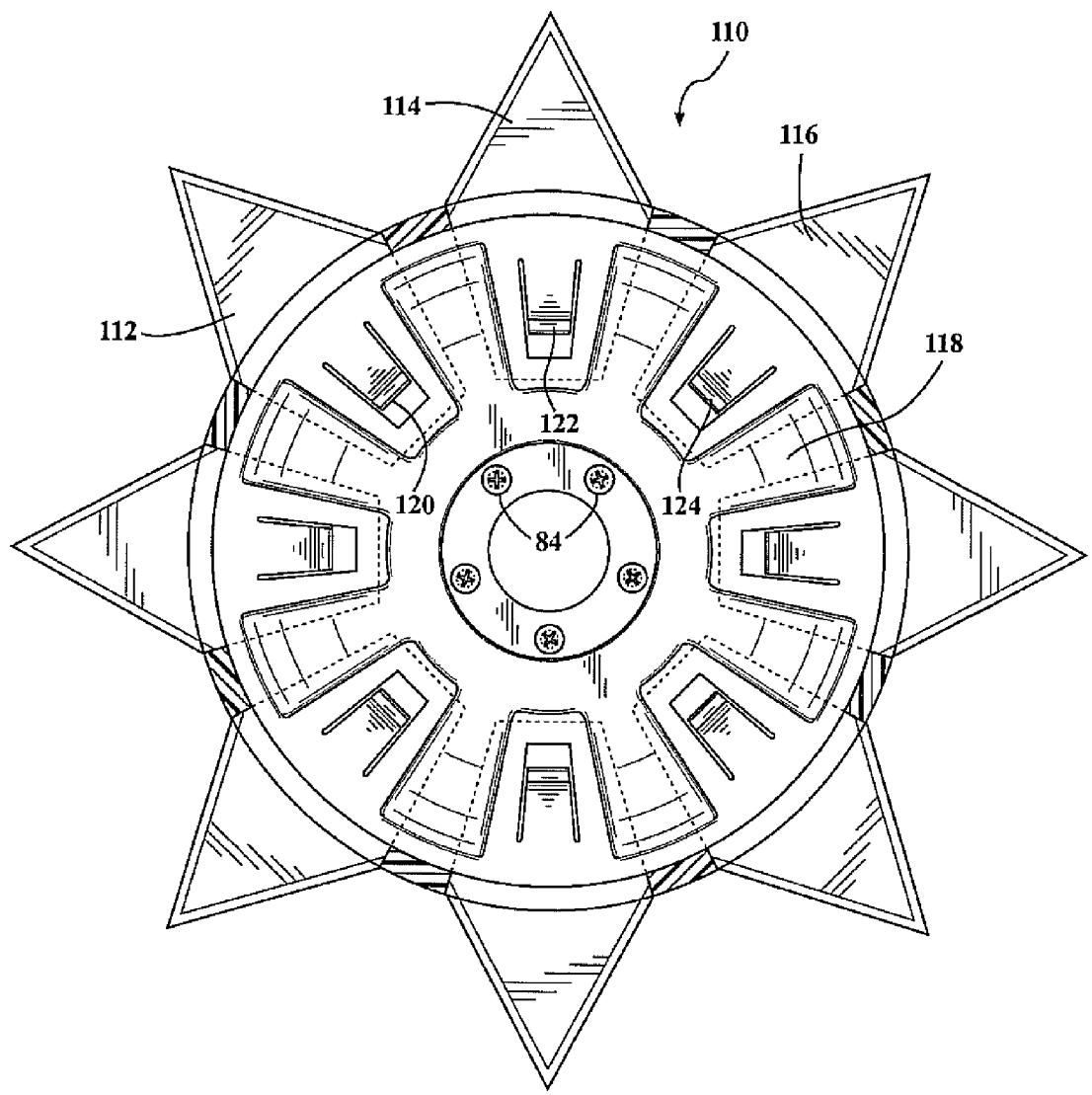
FIG. 9A is a plan view depicting a plurality of eight individual blades (points) arranged in radially outwardly engaged fashion according to another non-limiting variant.

FIG. 9A is a plan view, generally at 110, depicting a plurality of eight individual blades (points), such as shown at 112, 114, 116, et seq., according to a design such as previously described and which are arranged in radially outwardly engaged fashion according to another non-limiting variant. In this variant, the wheel secured and pocket defining template, as well as the covering cap, a modification of which being shown at 118 with modified inner (free edge) extending and biased clip edges 120, 122, 124, et seq., for securing the redesigned larger plurality of blades about the perimeter of the wheel assembly.

Each of the blades depicted in FIGS. 8-10 exhibits a continuous outer edge (see at 126 in FIG. 10 for selected plate 96), it being understood that the blade edges are modifiable in a similar fashion as described in reference to the integrated edging plates of FIG. 4-7. FIG. 11 is an illustration of a selected attachable blade 128 exhibiting a serrated edge pattern with alternating patterns 130 and 132, this comparable to patterns 28 and 30 associated with edging plate 14 in FIG. 2. The blade 128, as with blade 96 shown in FIG. 10, includes a single aperture receiving pocket 134 such that it can be installed and removed in the non-adjustable fashion previously described in FIG. 10.

FIG. 12 is an illustration of a further selected attachable blade 136 exhibiting a modified and more finely serrated cutting edge profile 136. FIG. 13 is an illustration of a yet further selected attachable blade 140 exhibiting a further alternate serrated and notched blade edge profile with locations 142 and 144 (compared to 40 and 42 as depicted in FIG. 5), it being understood that such a pattern can again be modified as shown in the prior example of FIG. 7 in order to render the individual blades reversible). As again stated, each of the blades can exhibit a range of profiles not limited to that which is depicted, however which is shown to include a pointed arrow edge (see at 146 in FIG. 13).

Figure 14:
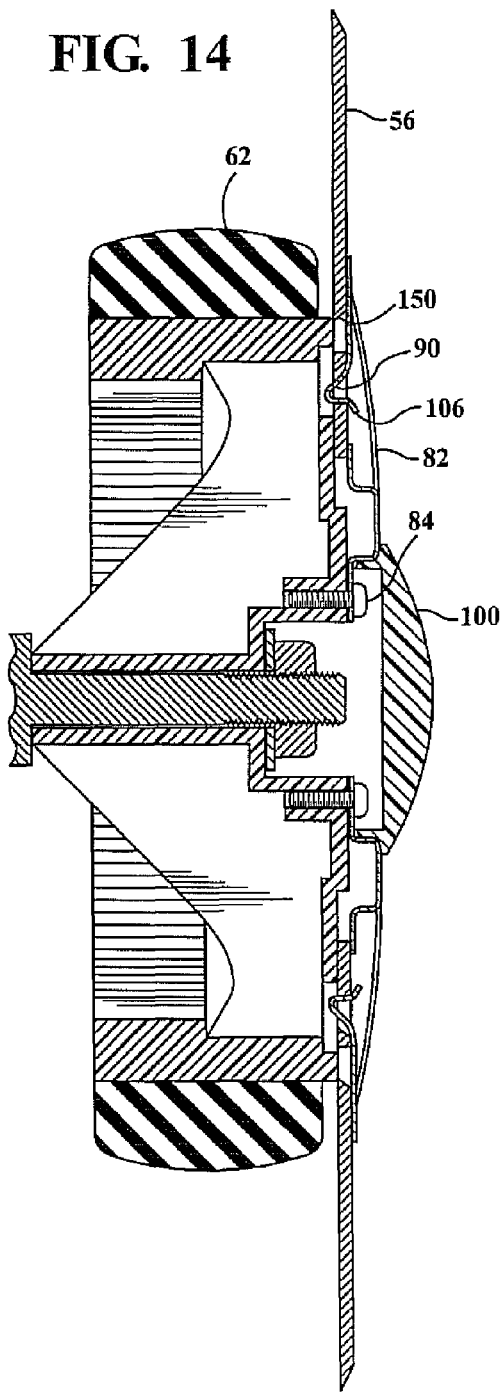
FIG. 14 is a side cutaway of the combination wheel and edging apparatus including attachable blades such as shown in FIG. 8, with each exhibiting a dual slot arrangement for facilitating radial adjustability.
Figure 15:
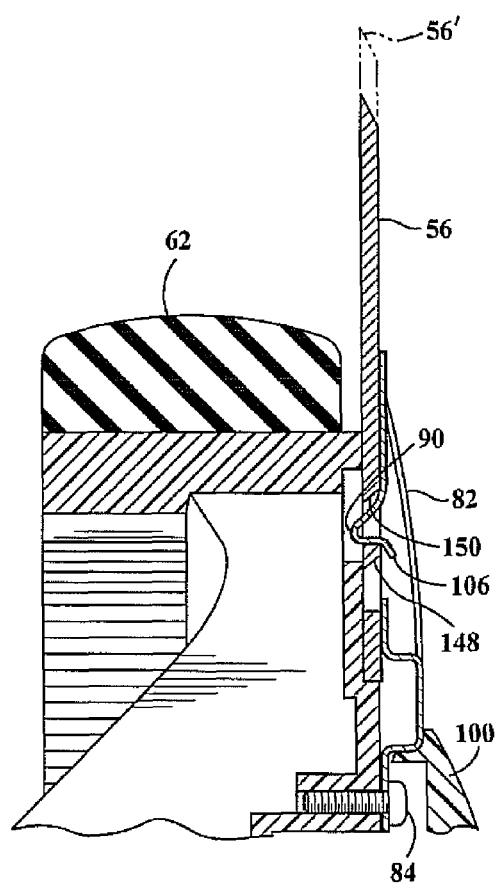
FIG. 15 is an enlarged and upper cross section of a wheel and edging apparatus according to sub-variant of FIG. 14 and in which inner cam edge surfaces are associated with each of the pair of clip engagement slots in order to facilitate smooth engagement and outward displacing adjustability.

FIG. 14 is a side cutaway of a combination wheel and edging apparatus including attachable blades, e.g. again at 56, such as shown in FIG. 8, with each exhibiting the dual slot arrangement for facilitating radial adjustability. FIG. 15 is an enlarged and upper cross section of a wheel and edging apparatus according to sub-variant of FIG. 14, and in which chamfer edge surfaces, at 148 and 150, are shown and which are associated with each of the pair of clip engagement (outer and inner) slots or apertures.

The angled profile of the cam surfaces are such that, the selected blade can be outwardly adjusted simply by pulling on the blade and without having to previously outwardly deflect the clip 90 end defining biasing portion 106 in order to unseat from inner aperture 148 and to reseat in the outer aperture 150 (see further outward displacing adjustability as depicted by solid 56 and phantom 56' in FIG. 15). Readjustment to the inner aperture 148 (or alternately removal of the blade from the assembly) can also be accomplished by outwardly deflecting the clip 90 in the manner previously described in FIG. 10.

Figure 16:
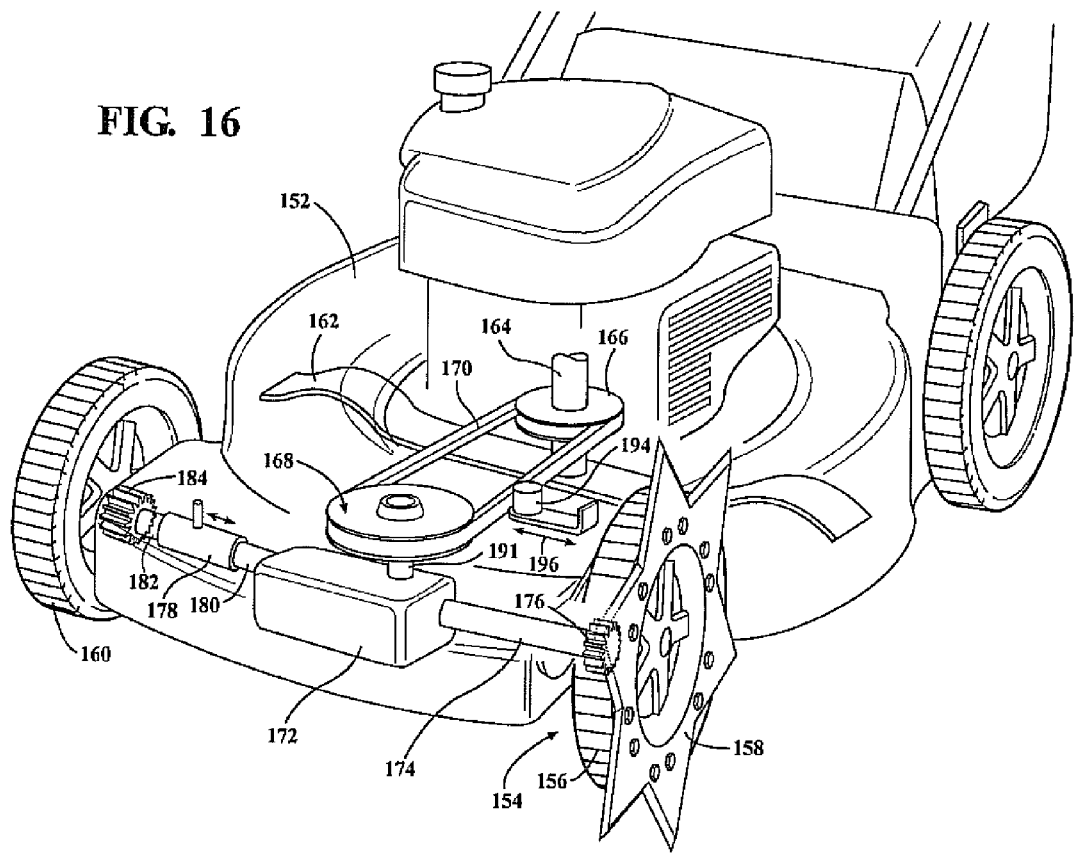
FIG. 16 is an environmental view of a modified walk behind powered mower according to a further embodiment and which integrates an adjustment mechanism for modifying a rotary turning speed of a combination drive wheel and edging plate combined with an optional secondary drive wheel disconnect linkage, the main blade housing of the mower also exhibiting an enlarged/widened design to facilitate vacuum intake of the edging debris.

Referring now to FIG. 16, an environmental view is shown of a modified walk behind powered mower 152 according to a further embodiment and which integrates an adjustment mechanism for modifying a rotary turning speed of a combination drive wheel and edging plate, generally referenced at 154, and which includes a powered (self-propelled) wheel 156 to which is secured an edging plate 158 in a manner as previously described. Without limitation, the edging plate 158 (similar to that shown at 16 in FIG. 4) can be substituted for any other design not limited to that previously illustrated and described and can also include the use of attachable blades.

The redesigned mower 152 can include either a single driving wheel 156 or, as shown, combines a secondary drive wheel 160. The associated motor of the mower drives, such as which concurrently drives the rotating mower blade 162, can also rotate a shaft 164 to which is mounted a first (drive) pulley 166. A forward located pulley assembly 168 is caused to rotate by a belt 170 extending between the drive pulley 160 and the forward pulley assembly 168. A universal gearing arrangement (not shown) is integrated into a forward located housing 172, from which a first rotating drive is imparted via a first shaft 174 extending to a drive gear 176 operating the wheel 156 and edging plate 158.

A disconnect linkage 178 is provided at an opposite side of the universal housing 172 and operates to uncouple the driving output of a second spline shaft 180 from likewise rotating an outer/idler spline shaft 182 with drive gear 184, and so that the second forward wheel 160 is uncoupled. It is desirable to be able to uncouple a second powered wheel of the mower in order to not interfere with the edging operation being concurrently performed by the other forward wheel assembly 154.

Figure 17:
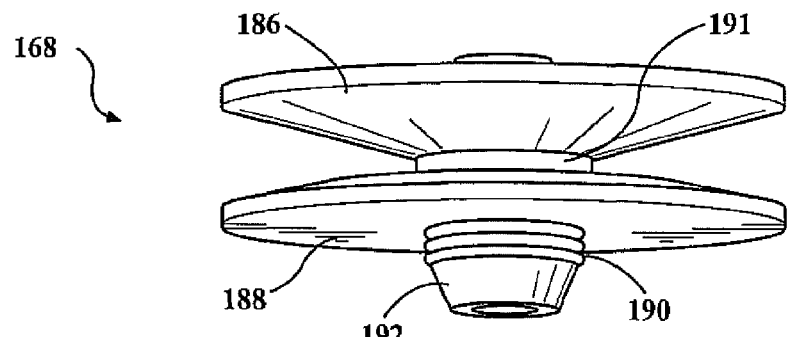
FIG. 17 is a sectional view of a variable speed pulley component incorporated into the mower assembly of FIG. 16.

With reference to FIG. 17, a sectional view is shown of a variable speed function built into the pulley subassembly 168. In this design, the subassembly includes an upper pulley half 186 and a lower pulley half 188 which seat the belt 170 therebetween. The pulley halves 186 and 188 are biased in an opposing/closed position by a coil spring 190 mounted underneath the lower pulley half 188 and around a shaft support 191. The upper pulley half 186 is fixed to an upper end of the shaft 191, with the lower pulley half 188 slideable a limited distance along the shaft and influenced upwardly by the coil spring 190 which is anchored at its bottom by an annularly enlarged and fixed pedestal 192 fixed to the shaft support 191.

Figure 17A:
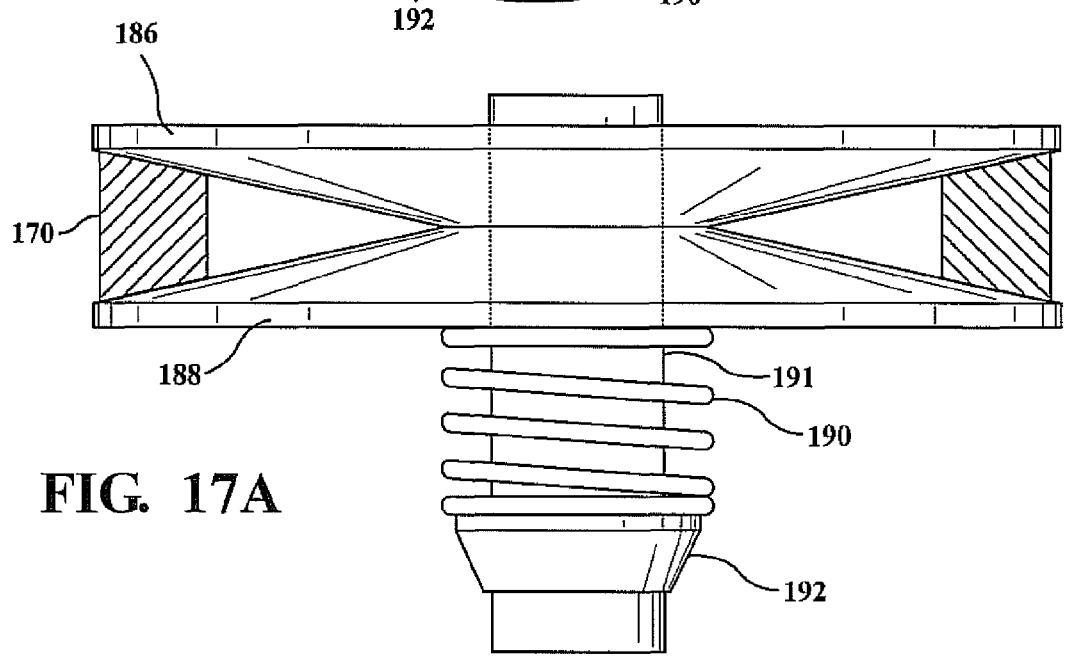
FIG. 17A is a side view of the pulley of FIG. 17 in which the power take off drive belt encircles an outer diameter location of the pulley communicating with the forward wheel drive linkage.
Figure 17B:
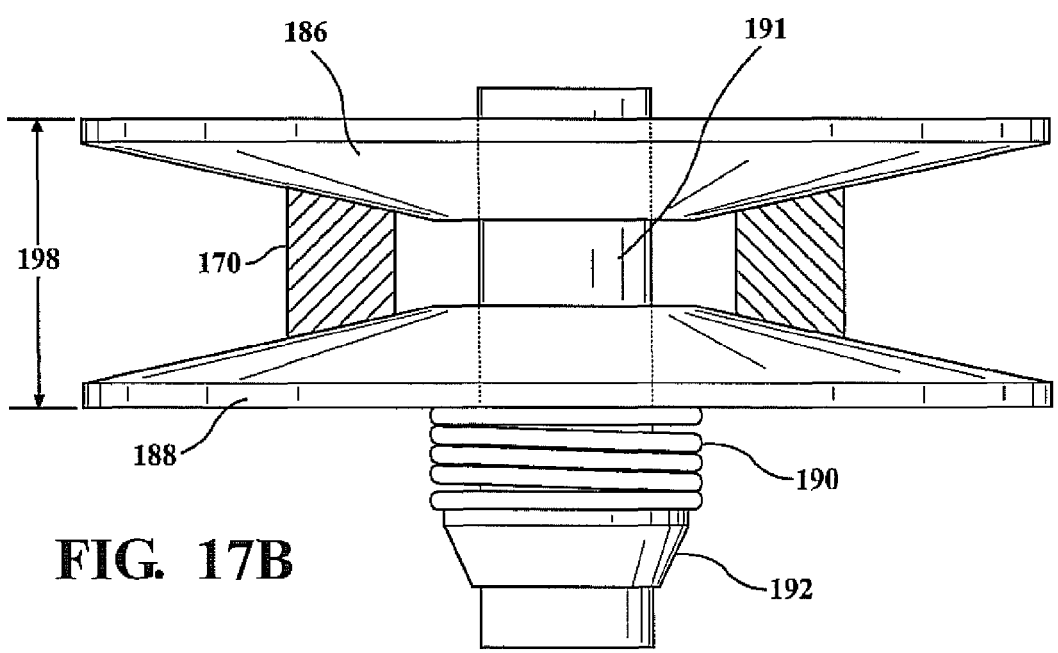
FIG. 17B is a succeeding side view of the pulley and in which a pinching/tensioning member associated with the belt causes upper and lower pulley halves to separate, resulting in the belt converging to an inner diameter location of the pulley and delivering higher rotary output speed to the combination drive wheel and edging plate.

In the position of FIG. 17A, the pulley halves 186 and 188 abut one another, due to the upwardly biasing influence of the spring 190, such that the belt 170 is seated at an outermost diameter encircling location. As shown in FIG. 16, a belt compression member 194 is provided and, upon being displaced in an inward direction as depicted by arrow 196, pinches the belt 170, with the result that it transfers a separation force to the lower (displaceable) pulley half 188, overcoming the biasing forces of the spring 190 and causing the lower half 188 to separate from the upper half 186 along the shaft support 191 to achieve a separation distance (see arrow 198 in FIG. 17B).

Simultaneously, the belt 170 descends inwardly to a minimal seating diameter between the now separated pulley halves 186 and 188, the result being the delivery of a higher rotary output speed to the combination drive wheel and edging plate assembly 154. Retraction of the compression member 194 relaxes the compression imparted upon the belt 170, resulting in the spring forces 190 returning the lower pulley half 188 into contact with the upper pulley 186 (FIG. 17A) and the belt 170 to its original outer diameter (and slower turning) position.

Figure 18:
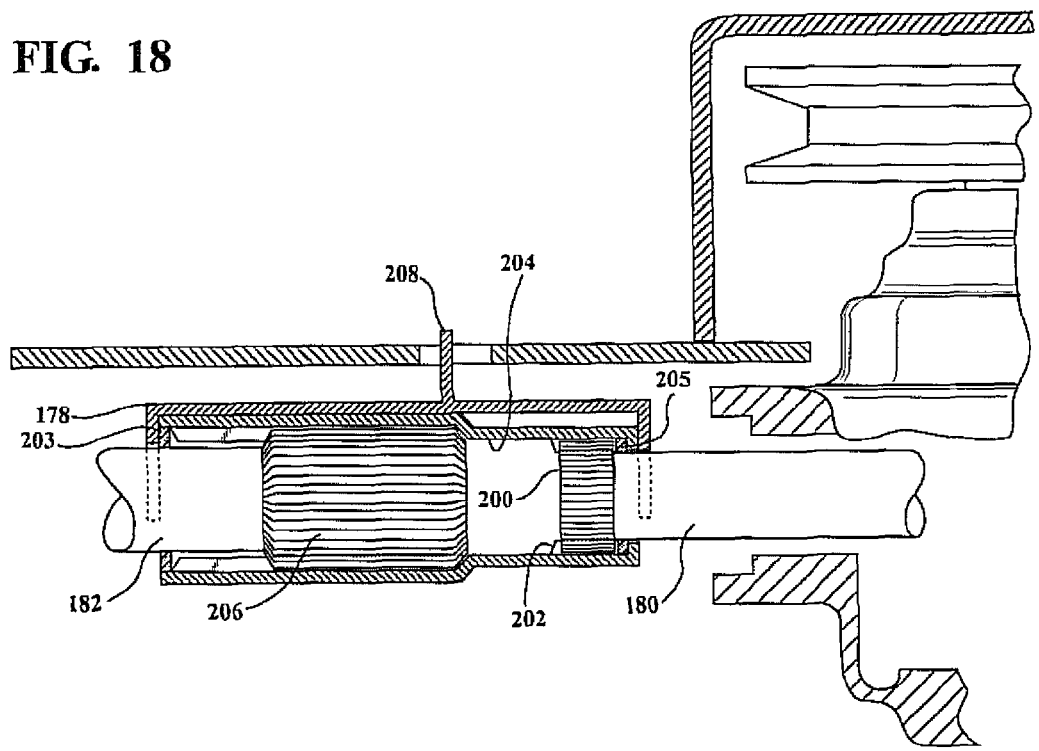
FIG. 18 is an enlarged cutaway of a forward located disengagement mechanism incorporated into the modified mower of FIG. 16 and which depicts the second drive wheel in a first engaged position.

FIG. 18 is an enlarged cutaway of the forward located disengagement linkage or mechanism 178 incorporated into the modified mower of FIG. 16 and which depicts a first engaged position for driving the second wheel 160 shown in FIG. 16. As shown in cutaway, the spline drive output shaft 180 extends within a first side of the linkage housing and terminates in a gear 200.

In the first engaged position, the gear 200 meshes with a plurality of teeth 202 defined in inner facing fashion proximate an inner end of a sleeve shaped spline coupling 204 which is rotatable within the outer housing of the mechanism 178. A collar support 206 is shown in the cutaway view and which defines an inner supported end of the spline output shaft 182 and which causes the outer idler shaft 186 to rotate with the drive shaft 180. A pair of outer seals 203 and 205 close off opposite lineal ends of the linkage mechanism 178 and so that the mechanism is supported in a laterally shifting or traversable fashion as shown in FIGS. 18-19, with the shafts 180 and 182 being fixed in location.

FIG. 19 is a succeeding illustration of the forward disengagement mechanism 178 in a second laterally displaced position, and which is caused by an upper tab 208 extending from the outer linkage housing projecting through a slot defining location of the mower. The tab 208 is shifted from the position shown in FIG. 18 to that depicted in FIG. 19 such that the mechanism 178 is laterally shifted inwardly resulting in the teeth 202 sliding out of engagement with the gear 200, thus uncoupling the outer idler spline shaft 182 from the (inner) spline drive shaft 180 and disengaging the wheel 160, again by uncoupling the rotation of the inner sleeve 204 from the inner shaft 180 by outwardly displacing the inner teeth 202 from contact with the gear 200.

Finally, FIG. 20 is a partial end cutaway further depicting the widened design of the main blade housing, this likewise being depicted by widened body 152 in FIG. 16 of the mower. As shown, the widened design of the mower housing and associated rotating blade 152 facilitates vacuum intake of the edging debris, thus reducing cleanup.

Having described my invention, other and additional preferred embodiments will become apparent to those skilled in the art to which it pertains, and without deviating from the scope of the appended claims.

I claim:

1. A replacement combination drive wheel and edging assembly incorporated into a self-propelled lawn mower, said replacement drive wheel mounted to the mower in communication with a rotating power output of the mower, said assembly comprising:

a template secured to an outer face of said wheel, a plurality of peripherally arrayed pockets configured within said template, each of which including a plurality of interconnected and recessed edges;

a plurality of blades seated within said pockets to establish a peripheral projecting blade pattern supported upon the outer face of said wheel; and a covering cap affixed over said template to retain said blades within said pockets in immovable fashion between said template and said cap and such that, upon positioning said blade pattern in contact with an edge overgrowth of turf, rotation of said wheel facilitates an edging operation.

2. The assembly as described in claim 1, said blade pattern further comprising a serrated edge incorporated into each of said individual blades.

3. The assembly as described in claim 2, said serrated edge further comprising first and second alternating patterns, one of which including a plurality of inward notches.

4. The assembly as described in 1, each of said blades further comprising an arrow shaped portion having first and second angled blade edges and interconnecting support edges for seating within said pockets.

5. The assembly as described in claim 4, at least a tip of said arrow shaped portions further comprising a carbide material.

6. The assembly as described in claim 1, further comprising a plurality of biasing clips defined in said covering cap in alignment with said blades, an inwardly biased portion of each clip seating within at least one interior aperture formed in each blade.

7. The assembly as described in claim 6, said aperture formed in each of said blades further comprising a pair of spaced apart apertures for facilitating outward adjustability of said blades from a first position to a second position.

8. The assembly as described in claim 7, at least one of said apertures further comprising a chamfer edge.

* * * * *